US012157395B2

(12) United States Patent
Cox et al.

(10) Patent No.: US 12,157,395 B2
(45) Date of Patent: Dec. 3, 2024

(54) MANAGING A BATTERY'S STATE OF CHARGE USING AN ECAT FOR A HYBRID VEHICLE

(71) Applicant: Ford Global Technologies, LLC, Dearborn, MI (US)

(72) Inventors: David Cox, London (GB); Mark Turnbull, Middlesex (GB)

(73) Assignee: FORD GLOBAL TECHNOLOGIES, LLC, Deaborn, MI (US)

( * ) Notice: Subject to any disclaimer, the term of this patent is extended or adjusted under 35 U.S.C. 154(b) by 0 days.

(21) Appl. No.: 18/225,299

(22) Filed: Jul. 24, 2023

(65) Prior Publication Data

US 2024/0025292 A1 Jan. 25, 2024

Related U.S. Application Data

(63) Continuation of application No. 17/240,759, filed on Apr. 26, 2021, now Pat. No. 11,745,617.

(51) Int. Cl.

| | |
|---|---|
| ***H02J 7/00*** | (2006.01) |
| ***B60L 58/12*** | (2019.01) |
| ***B60L 58/13*** | (2019.01) |
| ***B60L 58/24*** | (2019.01) |
| *B60L 50/61* | (2019.01) |

(52) U.S. Cl.

CPC ............... *B60L 58/12* (2019.02); *B60L 58/13* (2019.02); *B60L 58/24* (2019.02); *B60L 50/61* (2019.02); *B60L 2240/423* (2013.01); *Y02T 10/62* (2013.01)

(58) Field of Classification Search

CPC .......... B60L 58/12; B60L 58/13; B60L 58/24; B60L 50/61; B60L 2240/423; Y02T 10/62

USPC .................................... 320/109, 132; 701/22

See application file for complete search history.

(56) References Cited

U.S. PATENT DOCUMENTS

| | | | | |
|---|---|---|---|---|
| 5,345,761 | A | 9/1994 | King et al. | |
| 6,057,605 | A | 5/2000 | Bourne et al. | |
| 8,919,100 | B2 | 12/2014 | Verbrugge et al. | |
| 2009/0277705 | A1* | 11/2009 | Ichikawa | B60L 50/16 180/65.21 |
| 2010/0212981 | A1* | 8/2010 | Roos | B60W 20/10 903/930 |
| 2021/0135483 | A1* | 5/2021 | Hirooka | F01N 3/2006 |

FOREIGN PATENT DOCUMENTS

| | | |
|---|---|---|
| FR | 2927360 A1 | 8/2009 |
| JP | 5309624 B2 | 10/2013 |

* cited by examiner

*Primary Examiner* — Zixuan Zhou

(74) *Attorney, Agent, or Firm* — HALEY GUILIANO LLP

(57) ABSTRACT

The present disclosure relates to systems and methods for managing a state of charge of a hybrid vehicle battery using an eCAT. Electrical energy is provided to a hybrid system for storage at the battery of the hybrid system. A first state of charge of the battery of the hybrid system is determined. Upon determining that the first state of charge is within a predetermined upper range, a determination is made as to whether to increase energy supplied to one or more hybrid vehicle components, the one or more hybrid vehicle components comprising at least the eCAT. At least a portion of the electrical energy is consumed at the eCAT.

16 Claims, 9 Drawing Sheets

202
Brake Application (resulting in B-Term Regeneration)
On/Off
1
0
0 2 4 6 8 10 12 14 16 18
Time (S)
204
eCAT Activation
On/Off
1
0
0 2 4 6 8 10 12 14 16 18
Time (S)
206
HEV Battery SOC
SOC %
100 95 90 85 80 75 70
0 2 4 6 8 10 12 14 16 18
Time (S)
208
Vehicle Speed
Km/h
80 70 60 50 40 30 20 10 0
0 2 4 6 8 10 12 14 16 18
Time (S)

302
Brake Application (resulting in B-Term Regeneration)
On/Off
1
0
0 2 4 6 8 10 12 14 16 18
Time (S)
304
eCAT Activation
On/Off
1
0
0 2 4 6 8 10 12 14 16 18
Time (S)
306
HEV Battery SOC
SOC %
100 95 90 85 80 75 70
0 2 4 6 8 10 12 14 16 18
Time (S)
308
Vehicle Speed
Km/h
80 70 60 50 40 30 20 10 0
0 2 4 6 8 10 12 14 16 18
Time (S)

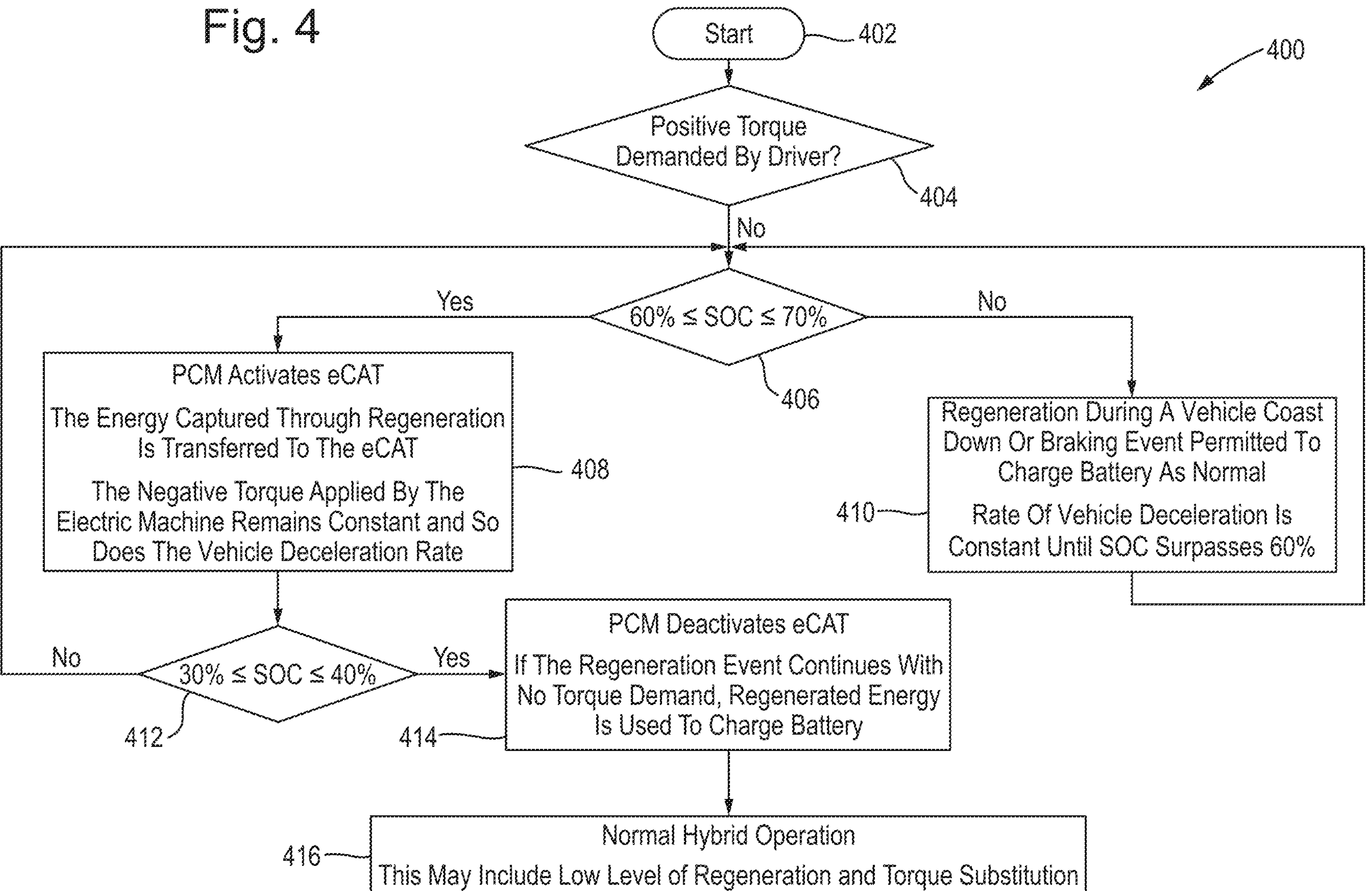

Fig. 4
Start
402
400
Positive Torque Demanded By Driver?
404
No
Yes
60% ≤ SOC ≤ 70%
No
PCM Activates eCAT
The Energy Captured Through Regeneration Is Transferred To The eCAT
The Negative Torque Applied By The Electric Machine Remains Constant and So Does The Vehicle Deceleration Rate
406
408
Regeneration During A Vehicle Coast Down Or Braking Event Permitted To Charge Battery As Normal
Rate Of Vehicle Deceleration Is Constant Until SOC Surpasses 60%
410
No
30% ≤ SOC ≤ 40%
Yes
412
PCM Deactivates eCAT
If The Regeneration Event Continues With No Torque Demand, Regenerated Energy Is Used To Charge Battery
414
Normal Hybrid Operation
This May Include Low Level of Regeneration and Torque Substitution
416

600
Start
Providing electrical energy to a hybrid system for storage
602
604
Determining a first state of charge of a battery of the hybrid system
Determining to increase energy supplied to one or more hybrid vehicle components using the electrical energy
606
608
Consuming at least a portion of the electrical energy at the eCAT

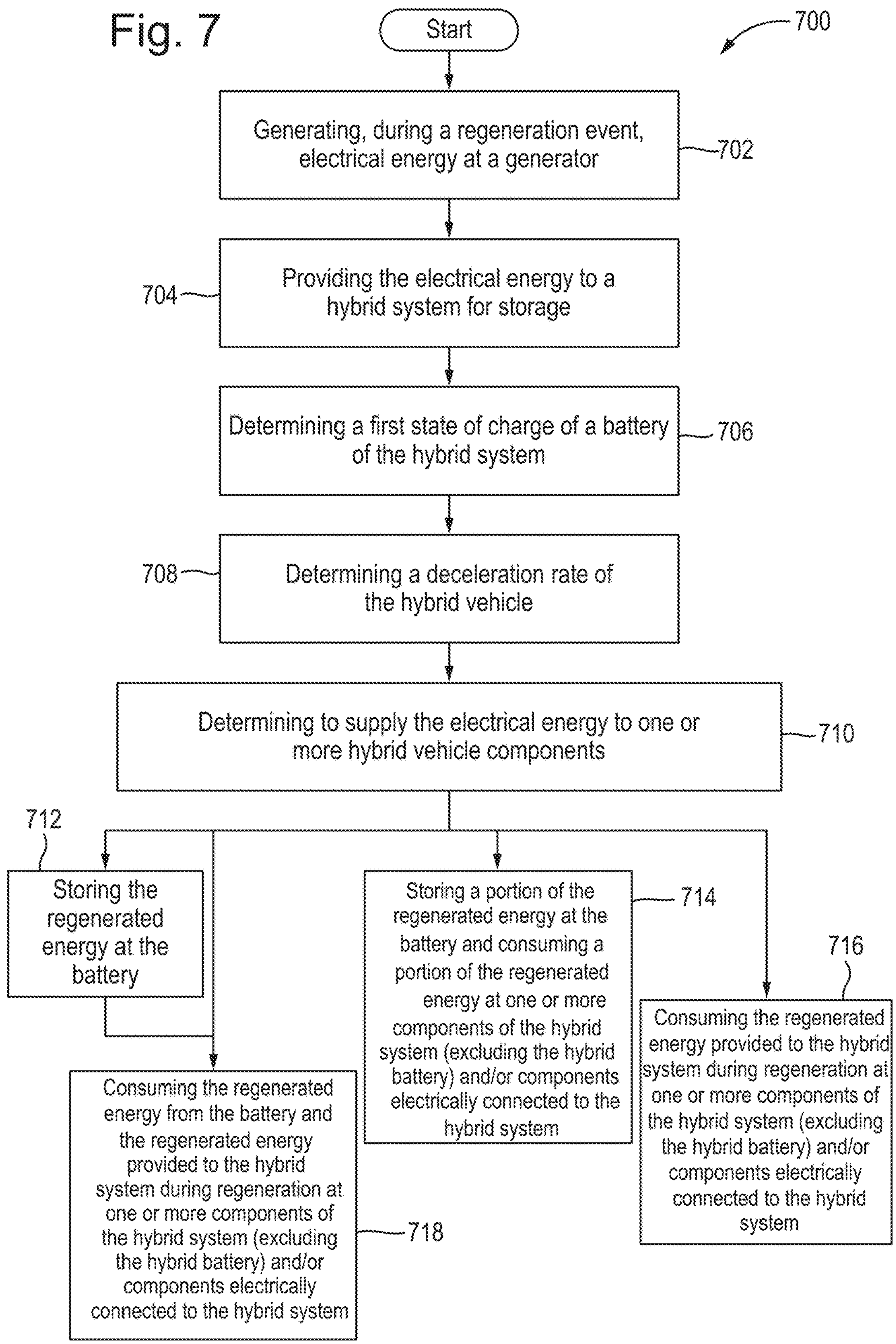
Fig. 7
Start
700
Generating, during a regeneration event, electrical energy at a generator
702
Providing the electrical energy to a hybrid system for storage
704
Determining a first state of charge of a battery of the hybrid system
706
Determining a deceleration rate of the hybrid vehicle
708
Determining to supply the electrical energy to one or more hybrid vehicle components
710
712
Storing the regenerated energy at the battery
Storing a portion of the regenerated energy at the battery and consuming a portion of the regenerated energy at one or more components of the hybrid system (excluding the hybrid battery) and/or components electrically connected to the hybrid system
714
716
Consuming the regenerated energy provided to the hybrid system during regeneration at one or more components of the hybrid system (excluding the hybrid battery) and/or components electrically connected to the hybrid system
Consuming the regenerated energy from the battery and the regenerated energy provided to the hybrid system during regeneration at one or more components of the hybrid system (excluding the hybrid battery) and/or components electrically connected to the hybrid system
718

MANAGING A BATTERY'S STATE OF CHARGE USING AN ECAT FOR A HYBRID VEHICLE

CROSS REFERENCE TO RELATED APPLICATIONS

This application is a continuation of U.S. patent application Ser. No. 17/240,759, filed Apr. 26, 2021, the disclosure of which is hereby incorporated by reference herein in its entirety.

BACKGROUND

The present disclosure relates to the use of an electrically heated catalyst during vehicle operation. More particularly, but not exclusively, the present disclosure relates to managing a battery's state of charge, and/or the state of charge of any other energy storage device within the hybrid system, using an electrically heated catalyst.

SUMMARY

Electrical energy is typically recuperated during a regeneration event, such as a vehicle coast down event or a braking event, to regenerate energy utilizing the vehicle's kinetic energy. During a regeneration event, hybrid vehicles convert a portion of the vehicle's kinetic energy to electrical energy by applying negative torque using an electric machine. The regenerated electrical energy can be stored at a battery within the hybrid system and used to increase the drivable range of the vehicle or to power vehicle accessories, for example.

A hybrid battery is not an infinite store of energy. Therefore, as the battery's state of charge approaches a predetermined upper state of charge threshold, the regeneration rate begins to decrease, clip or ramp out in order to protect the battery from exceeding the predetermined upper state of charge threshold. With the driveline closed, the electric machine helps to decelerate the vehicle. However, the load placed on the engine by the electric machine, resulting from the reduced rate of regeneration, can negatively impact drivability for customers due to a sudden change in deceleration rate.

Today, to prevent or delay the regeneration event ramping out on hybrid applications, torque substitution is used to reduce the battery's state of charge in advance of the regeneration event while positive torque is applied. Although torque substitution may enable a future regeneration event to capture and store the energy, it often does not decrease the battery's state of charge sufficiently to mitigate the need to reduce or clip energy regeneration or recuperation during regeneration events. Also, using torque substitution may not be desirable in some cases, as the engine may already be operating efficiently.

Furthermore, even when torque substitution is applied and the energy store of the battery is depleted to its minimum threshold, for some applications such as MHEV applications or applications having a small battery capacity, occupants of the vehicle may encounter the clip in energy regeneration. For example, this can occur for heavily laden commercial vehicles or vans during an extended decline as the MHEV battery energy store in such vehicles can replenish even when starting the regeneration event from a low battery state of charge due to the vehicle's inertia.

During an ongoing regeneration event, in conventional hybrid systems, there is no strategy to overcome the negative effects on vehicle drivability and performance. In view of the foregoing, the present disclosure provides an alternative to torque substitution during vehicle operation that prevents the need to decrease the rate of regeneration and deceleration in an ongoing or future regeneration event.

According to a first aspect, a method for managing a state of charge of an electrical storage device, e.g., a hybrid vehicle battery's state of charge, using an electrically heated catalyst (eCAT) is provided. The method comprises a step of providing electrical energy, e.g., energy generated during a regeneration event, to a hybrid system for storage. The method comprises a step of determining a first state of charge of a battery of the hybrid system. Upon determining that the first state of charge is within a predetermined upper range, e.g., 60% to 70% state of charge, the method further comprises a step of determining to increase (and subsequently increasing) energy supplied to one or more hybrid vehicle components, such as the eCAT. The method may comprise a step of selecting the eCAT from a plurality of hybrid vehicle components as a candidate to consume electrical power from the battery, e.g., by activating the eCAT. The method further comprises a step of consuming at least a portion of the electrical energy at the eCAT, e.g., to maintain or decrease the first state of charge of the battery.

An advantage of the present invention is that the driver/passenger is not in the loop with regards to eCAT deployment and therefore the eCAT can be controlled to manage the battery's state of charge and also to meet vehicle requirements without having any negative effects on customer experience.

In some examples, the method further comprises a step of generating, during a regeneration event, the electrical energy at a generator, e.g., an electric machine such as a belt-driven integrated starter/generator (BISG) and a step of providing the electrical energy to the battery for storage.

Accordingly, examples described herein are directed generally to controlling an eCAT function during regeneration events to address drivability issues associated with regenerative braking methods used in conventional hybrid vehicle systems. In some examples, a method of managing a regeneration event by providing electrical energy to an eCAT is provided to prevent the reduced deceleration performance and drivability of the hybrid vehicle.

In some examples, the step of consuming at least a portion of the electrical energy at the eCAT comprises consuming at least a portion of the electrical energy from the battery, e.g., by transferring the electrical energy provided and stored in the battery to the eCAT and/or consuming at least a portion of the electrical energy from the hybrid system.

The eCAT can be used to consume energy from the hybrid system during regeneration events to prevent the regeneration rate and deceleration rate being decreased and to protect the battery from damage.

In some examples, the step of consuming at least a portion of the electrical energy at the eCAT comprises determining a deceleration rate of the hybrid vehicle, e.g., based on the negative torque applied by the generator/electric machine, and consuming at least a portion of the electrical energy at the eCAT to maintain the deceleration rate.

In some examples, the method further comprises a step of determining a current aftertreatment temperature of an aftertreatment module, wherein the aftertreatment module has a predetermined threshold temperature, e.g., 250 degrees Celsius.

If heat energy from the combustion engine is reduced or limited due to operating conditions, it is likely the catalyst temperature will reduce below an acceptable temperature limit to maintain emissions. Therefore, the eCAT may be used to consume energy from the hybrid battery or directly from the electric machine based on aftertreatment temperature to satisfy emissions.

In some examples, the method further comprises a step of activating torque substitution, e.g., to reduce the state of charge of the battery to prevent the battery from exceeding the predetermined upper state of charge threshold, upon determining that the current aftertreatment temperature is above the predetermined threshold temperature.

In some examples, the step of determining to increase energy supplied to the one or more hybrid vehicle components comprising the eCAT is further based upon determining that the current aftertreatment temperature is below the predetermined threshold temperature and further wherein the step of consuming at least a portion of the electrical energy at the eCAT comprises consuming at least a portion of the electrical energy from the battery to support aftertreatment demand.

When the driver demands positive torque and the battery has a sufficient state of charge, e.g., over a predetermined threshold or within a predetermined upper range, the battery's energy can be used to support the eCAT or, alternatively, torque substitution. The process of activating one of the eCAT or torque substitution can be based on operational efficiency.

In some examples, the step of determining to increase energy supplied to the one or more hybrid vehicle components comprises determining to increase the energy supplied to the eCAT at a predetermined period before the current aftertreatment temperature reduces below the predetermined threshold temperature.

In some examples, the method further comprises determining a second state of charge of the battery, determining to decrease the energy supplied to the one or more hybrid vehicle components comprising the eCAT upon determining that the second state of charge is within a predetermined lower range, e.g., 30% to 40% state of charge, and terminating the step of consuming at least a portion of the electrical energy at the eCAT, e.g., by deactivating the eCAT.

According to a second aspect, a system for managing a battery's state of charge using an eCAT for a hybrid vehicle is provided. The system comprises means for providing electrical energy, e.g., generated during a regeneration event, to a hybrid system for storage and means for determining a first state of charge of a battery of the hybrid system. Upon determining that the first state of charge is within a predetermined upper range, e.g., 60% to 70% state of charge, the system further comprises means for determining to increase energy supplied to one or more hybrid vehicle components comprising the eCAT, e.g., by activating the eCAT, and means for consuming at least a portion of the electrical energy at the eCAT, e.g., to maintain or decrease the first state of charge of the battery.

According to a further aspect, there is provided a hybrid vehicle comprising the system of the second aspect.

According to a further aspect, there is provided a non-transitory computer-readable medium having non-transitory computer-readable instructions encoded thereon, when executed by control circuitry, cause the control circuitry to perform the method of the first aspect.

According to a further aspect, there is provided, a method for managing a battery's state of charge using an electrically heated catalyst (eCAT) for a hybrid vehicle is provided. The method comprises a step of providing electrical energy, e.g., energy generated during a regeneration event, to a hybrid system for storage and determining a first state of charge of a battery of the hybrid system. Upon determining that the first state of charge is within a predetermined upper range, e.g., 60% to 70% state of charge, the method further comprises a step of determining to increase energy supplied to one or more hybrid vehicle components comprising the eCAT, e.g., by activating the eCAT. The method further comprises a step of consuming at least a portion of the electrical energy at the eCAT, e.g., to maintain or decrease the first state of charge of the battery.

In some examples, the method further comprises a step of generating, during a regeneration event, the electrical energy at a generator, e.g., an electric machine such as a BISG and a step of providing the electrical energy to the battery for storage.

In some examples, the step of consuming at least a portion of the electrical energy at the eCAT comprises consuming at least a portion of the electrical energy from the battery, e.g., by transferring the electrical energy provided and stored in the battery to the eCAT and/or consuming at least a portion of the electrical energy from the hybrid system.

In some examples, the step of consuming at least a portion of the electrical energy at the eCAT comprises determining a deceleration rate of the hybrid vehicle, e.g., based on the negative torque applied by the generator/electric machine, and consuming at least a portion of the electrical energy at the eCAT to maintain the deceleration rate.

In some examples, the method further comprises determining a second state of charge of the battery, determining to decrease the energy supplied to the one or more hybrid vehicle components comprising the eCAT upon determining that the second state of charge is within a predetermined lower range, e.g., 30% to 40% state of charge, and terminating the step of consuming at least a portion of the electrical energy at the eCAT, e.g., by deactivating the eCAT.

According to a further aspect, there is provided, a method for managing a battery's state of charge using an electrically heated catalyst (eCAT) for positive torque operation of a hybrid vehicle is provided. The method comprises a step of providing electrical energy to a hybrid system for storage and determining a first state of charge of a battery of the hybrid system. Upon determining that the first state of charge is within a predetermined upper range, e.g., 60% to 70% state of charge, the method further comprises a step of determining to increase energy supplied to one or more hybrid vehicle components comprising the eCAT, e.g., by activating the eCAT. The method further comprises a step of consuming at least a portion of the electrical energy at the eCAT, e.g., to maintain or decrease the first state of charge of the battery.

In some examples, the method further comprises a step of determining a current aftertreatment temperature of an aftertreatment module, wherein the aftertreatment module has a predetermined threshold temperature, e.g., 250 degrees Celsius.

In some examples, the method further comprises a step of activating torque substitution, e.g., to reduce the state of charge of the battery to prevent the battery from exceeding the predetermined high state of charge threshold, upon determining that the current aftertreatment temperature is above the predetermined threshold temperature.

In some examples, the step of determining to increase energy supplied to the one or more hybrid vehicle components comprising the eCAT is further based upon determining that the current aftertreatment temperature is below the predetermined threshold temperature and further wherein the step of consuming at least a portion of the electrical energy at the eCAT comprises consuming at least a portion of the electrical energy from the battery to support aftertreatment demand.

In some examples, the step of determining to increase energy supplied to the one or more hybrid vehicle components comprises determining to increase the energy supplied to the eCAT at a predetermined period before the current aftertreatment temperature reduces below the predetermined threshold temperature.

In some examples, the method further comprises determining a second state of charge of the battery, determining to decrease the energy supplied to the one or more hybrid vehicle components comprising the eCAT upon determining that the second state of charge is within a predetermined lower range, e.g., 30% to 40% state of charge, and terminating the step of consuming at least a portion of the electrical energy at the eCAT, e.g., by deactivating the eCAT.

It shall be appreciated that other features, aspects and variations of the present disclosure will be apparent from the disclosure of the drawings and detailed description. Additionally, it will be further appreciated that additional or alternative examples of methods of and systems for managing a battery's state of charge using an electrically heated catalyst may be implemented within the principles set out by the present disclosure.

FIGURES

The above and other objects and advantages of the disclosure will be apparent upon consideration of the following detailed description, taken in conjunction with the accompanying drawings, in which:

FIG. 4 illustrates a schematic flowchart of an example use case of the present invention for use during regeneration events.

FIG. 7 shows a flowchart of a method of managing electrical energy stored in a hybrid system using an eCAT for a hybrid vehicle during a regeneration event.

The figures herein depict various examples of the present disclosure for purposes of illustration only. It shall be appreciated that additional or alternative structures, systems and methods may be implemented within the principles set out by the present disclosure.

DETAILED DESCRIPTION

Figure 1:
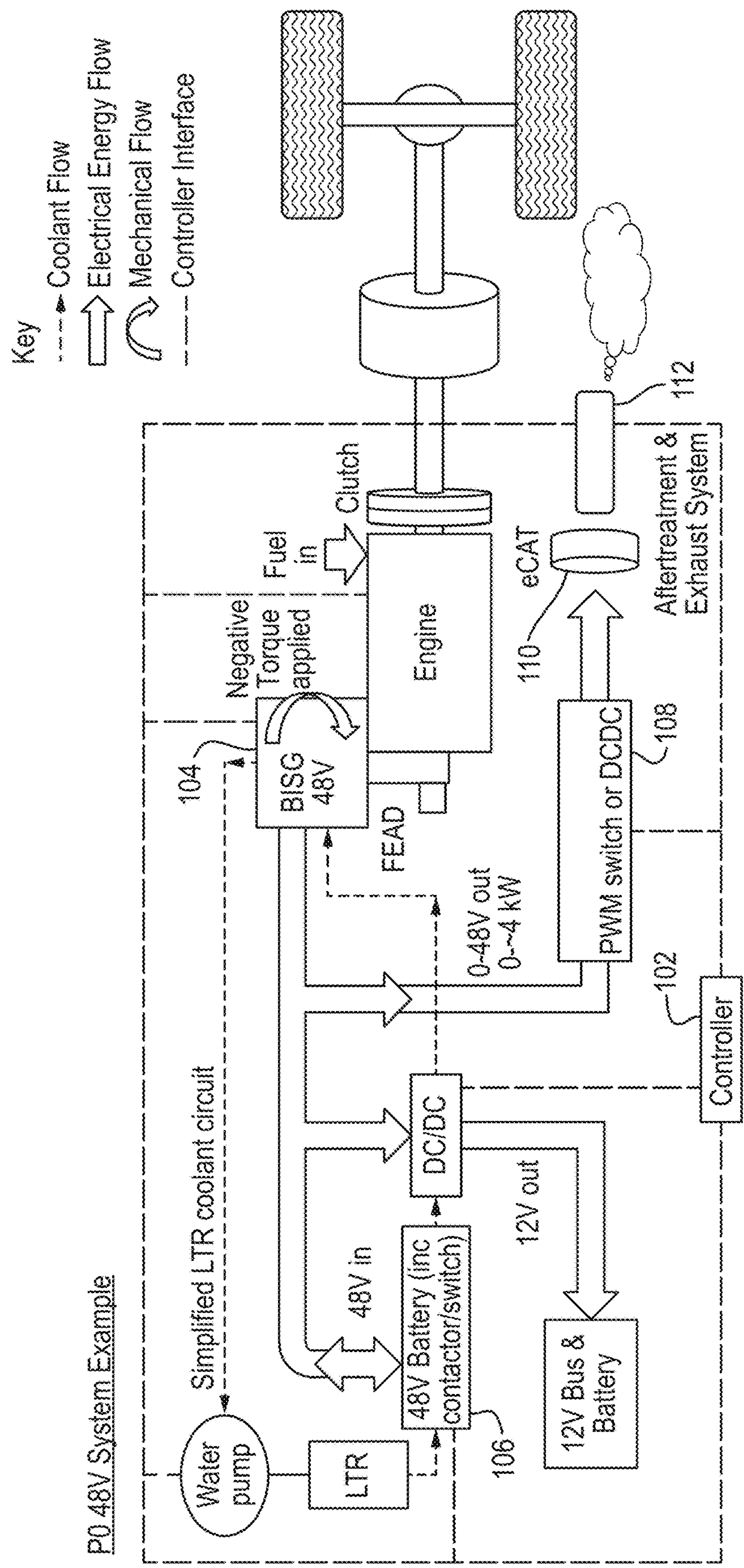
FIG. 1 shows an example flow diagram of a hybrid system utilizing an eCAT.

FIG. 1 shows an example flow diagram of a hybrid system 100 supporting the use of an eCAT 110, in accordance with some examples of the present disclosure. FIG. 1 also shows the flow of coolant, the flow of electrical energy, mechanical flow and the controller interface to illustrate the inner workings of the hybrid system 100. The present invention is not limited to the hybrid system 100 shown in FIG. 1 and may apply to other HEV, MHEV, PHEV and high voltage applications utilizing eCAT technology.

Regenerative braking enables a vehicle's kinetic energy to be converted to electrical energy during a vehicle coast down event or a braking and deceleration event, e.g., when a driver presses on a brake pedal, to conserve some of the energy that would otherwise be lost during the regeneration event. The converted electrical energy is typically transmitted to the vehicle's hybrid battery and stored there, increasing the battery's state of charge. The stored energy can then be used to extend the vehicle's driving range, to improve the overall energy efficiency of the vehicle or to power other accessories within the hybrid vehicle, for example.

During phases of regenerative braking, e.g., when a driver applies the brakes of the vehicle, an electric machine/generator, such as a BISG 104, applies negative torque to the propulsion system during regeneration. When in regenerator mode, the electric machine converts a portion of the vehicle's kinetic energy to electrical energy, e.g., to decelerate the vehicle. The recuperated energy can be stored at the vehicle's hybrid battery 106.

eCAT technology can be part of any hybrid vehicle application, gas or diesel. The eCAT is a heated element upstream of the aftertreatment module 112 and can provide airflow to the aftertreatment module 112. In hybrid systems, the eCAT is capable of absorbing a large amount of energy, as it is the largest accessory on the vehicle and can produce beneficial effects such as supporting emissions reduction. Therefore, it may be useful to provide energy to the eCAT often during vehicle operation.

In some examples, the electrical energy can be provided to the eCAT 110 via a switch or converter 108, e.g., a PWM switch or a DCDC converter. As shown in FIG. 1, controller 102, otherwise described as a powertrain controller module (PCM), can be used to control the operation of the hybrid system 100. For example, the PCM may signal to activate or deactivate the eCAT or to increase/decrease energy supplied to the eCAT.

In conventional methods, when the battery's state of charge approaches its predetermined upper state of charge threshold, the electric machine may be required to reduce its regeneration effect, i.e., the application of negative torque, to prevent the battery from exceeding the predetermined upper state of charge threshold. The change or reduction in negative torque can be noticeable to the driver, which can negatively impact drivability.

In other known methods, the energy produced through the regeneration process may be diverted to other accessories within the vehicle, e.g., seat heater, radiator fan or windscreen heater, to maintain a constant state of charge of the battery. Diverting the energy elsewhere, however, raises additional problems, as the electrical energy is typically required to be consumed by the other accessories within the vehicle. This is far from ideal, because occupants of the vehicle will notice the vehicle's environmental changes, which can result in poor customer experiences.

Other loads on the hybrid system, such as those supported by the DCDC, may be requested by occupants of the hybrid vehicle at any time. However, in cases when it is difficult or undesirable for the system to support the load, these features do not offer the same advantage as using the eCAT.

Figure 2:
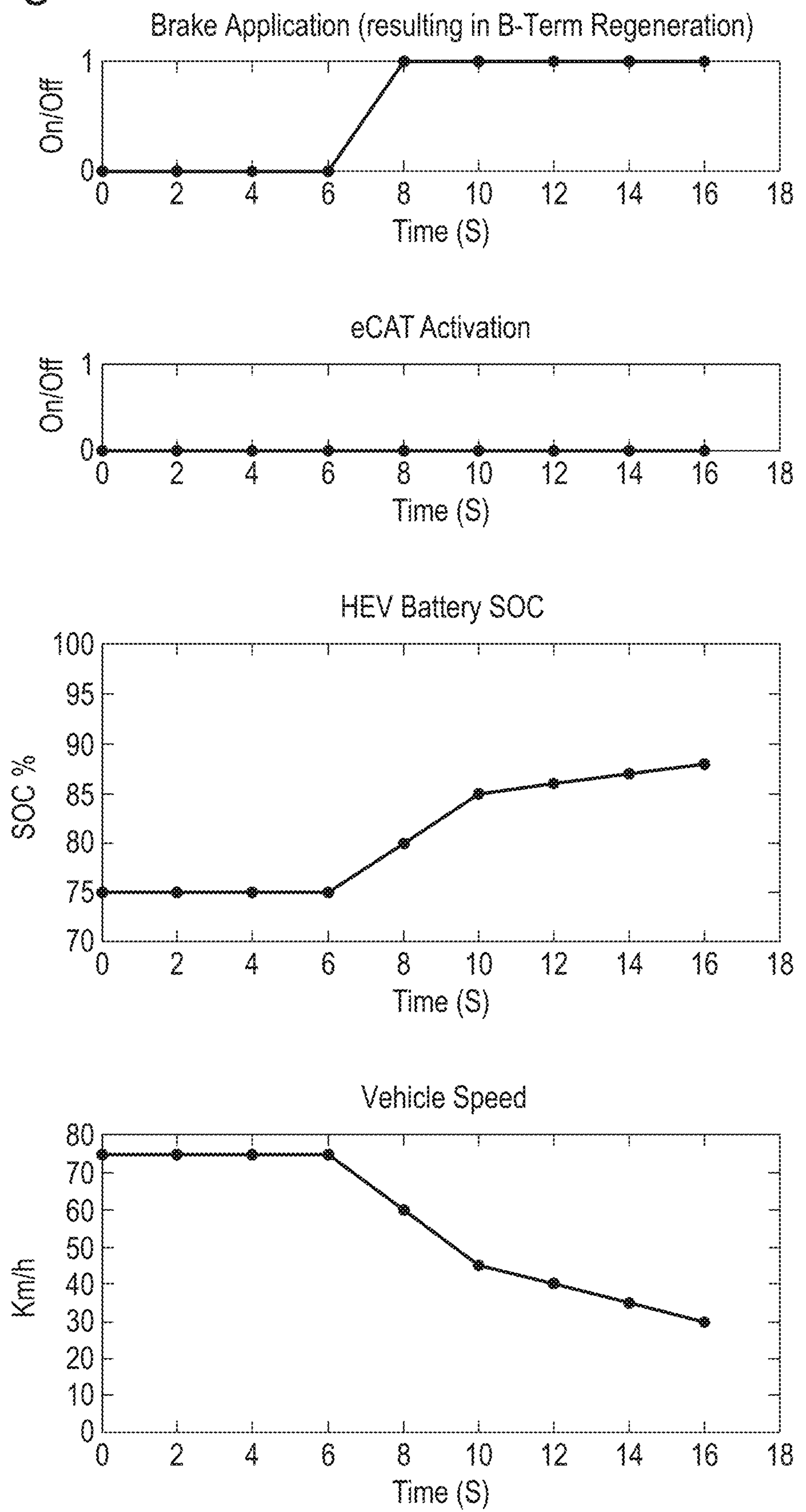
FIG. 2 depicts a conventional regenerative braking process illustrating the change in a battery's state of charge and the rate of deceleration during the conventional process.

FIG. 2 depicts a conventional regenerative braking process illustrating the change in a battery's state of charge and the rate of deceleration during the conventional process.

Graph 202 depicts the application of brakes by a driver over time as the vehicle travels down a descent, i.e., during a regeneration braking event. In the example of graph 202, the brakes are steadily applied, starting at 6 seconds and fully applied at 8 seconds. Graph 204 simply emphasises that there is no eCAT activation in conventional hybrid systems.

Graph 206 depicts the rate at which the battery's state of charge within a hybrid electric vehicle increases over time during the regeneration event. As the brakes are applied, as shown in graph 202, the electric machine begins to apply negative torque, resisting the engine or propulsion system, and provides electrical energy to the hybrid system to be stored in the hybrid battery, thereby increasing the battery's state of charge.

Typically, in vehicles such as MHEVs, the battery is small in terms of its capacity and can therefore reach its limit quickly. This is especially the case for commercial vehicle applications or vehicles with a high inertia/payload. Therefore, the regeneration rate needs to be reduced or clipped more quickly to protect the battery from damage.

As the battery approaches a predetermined upper state of charge threshold, otherwise described herein as a predetermined maximum threshold or an upper limit, the application of negative torque is typically reduced in order to decrease the rate of charge provided to the battery to protect it from exceeding the predetermined upper state of charge threshold. As shown in the example of FIG. 2, the battery charge rate reduces as the battery's state of charge nears 90%.

Graph 208 depicts the change in the hybrid vehicle's speed over time, i.e., the vehicle's deceleration rate. As shown in graph 208, the deceleration rate changes as a result of the change in the rate of regeneration as the battery's state of charge nears its upper state of charge limit. The change in the battery's rate of charge, therefore, impacts the vehicle's deceleration rate and thus impacts drivability.

As such, conventional methods and systems generally focus on the problem of energy storage or energy conversion and do not seek to manage a battery's state of charge, by maintaining or decreasing the amount of energy stored in a way that overcomes drivability issues during regeneration events, for example.

Thus, the present invention ensures that drivability is maintained without clipping regeneration to protect the battery, which may otherwise lead to a negative feeling or experience for the customer.

Accordingly, examples described herein are directed generally to controlling energy storage and/or consumption within hybrid systems, e.g., using an eCAT function, during hybrid vehicle operation, e.g., during regeneration events to address drivability issues associated with regenerative braking methods used in conventional hybrid systems. In some examples, a method of managing a regeneration event by providing electrical energy to an eCAT is provided to prevent the reduced deceleration performance and drivability of the hybrid vehicle. Using an eCAT enables an effective strategy for managing vehicle operation during regeneration events.

In some examples, the eCAT consumes energy from a hybrid battery, or directly from the hybrid system comprising an electric machine, during regeneration events. More specifically, the eCAT can consume energy from the hybrid system or battery during regeneration events to prevent the regeneration rate being decreased to protect the battery from damage. This is made possible as battery models are continuing to be developed as a component of hybrid vehicle powertrain systems to be able to predict the battery's state of charge accurately.

Figure 3:
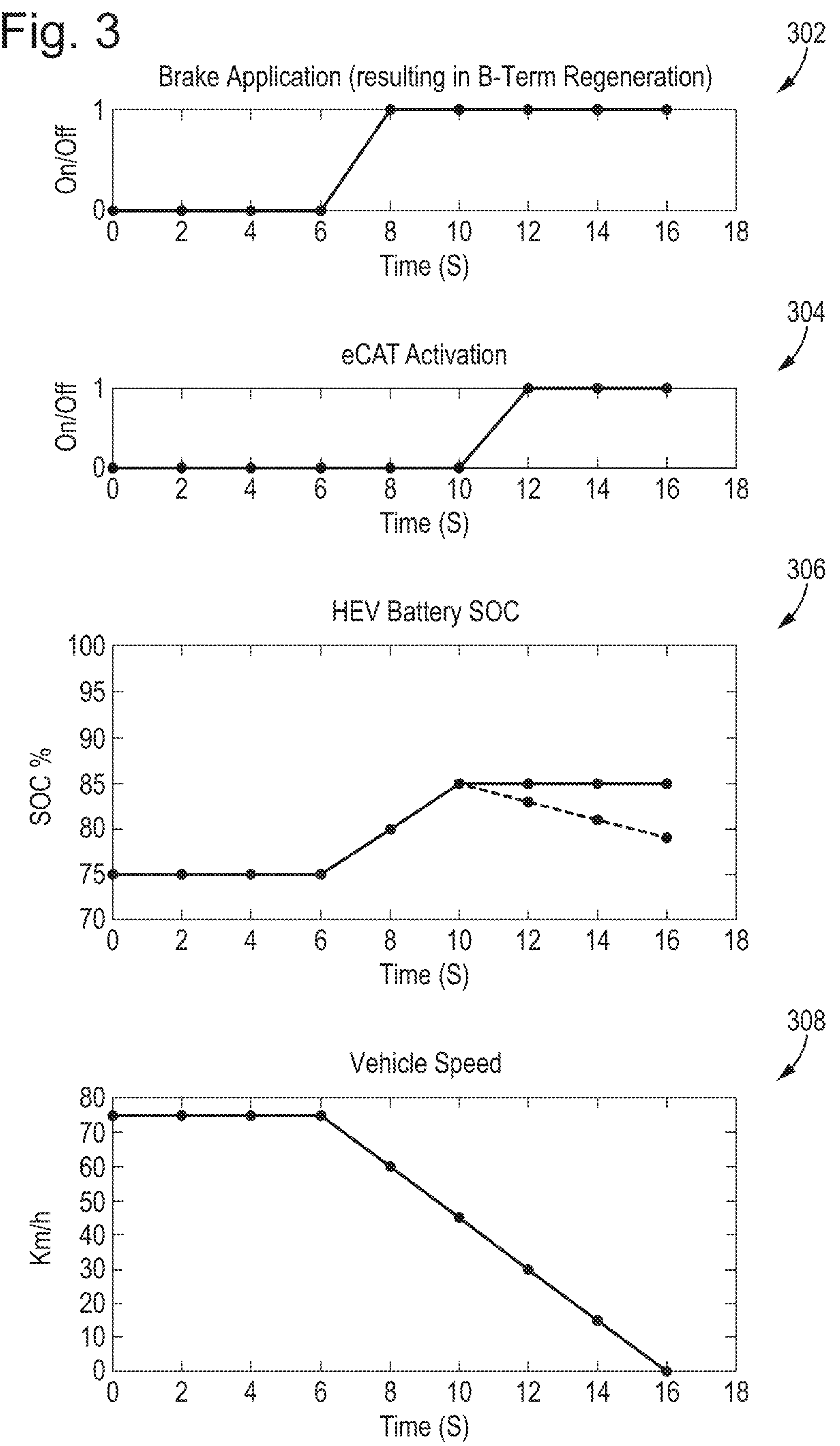
FIG. 3 depicts an example use case of the present invention wherein the rate of deceleration is maintained as constant during a regenerative braking event by utilizing the eCAT by either maintaining or reducing the state of charge of the battery.

FIG. 3 depicts an example use case of the present invention wherein the rate of deceleration is maintained as constant during a regenerative braking event by utilizing the eCAT.

Graph 302 depicts the application of brakes by a driver during a regeneration braking event over time. In the example of graph 302, the brakes are steadily applied, starting at 6 seconds and fully applied at 8 seconds, and graph 302 depicts the same driver demand as shown in graph 202, described above. Graph 304 depicts the activation of an eCAT by a PCM.

Graph 306 depicts an increase in energy supplied to the eCAT. The eCAT may consume any excess energy resulting from regeneration that cannot be stored in the battery due to its high state of charge, e.g., when the battery reaches its predetermined upper state of charge threshold. In some examples, the eCAT may consume energy from the hybrid battery or directly from the hybrid system comprising the electric machine during the regeneration event, thus enabling continuous energy regeneration during the regeneration event without negatively impacting drivability. This prevents the need to decrease the rate of regeneration in an ongoing or subsequent regeneration event, even when the battery nears its upper limit.

Depending on the vehicle's electrical loads being supported by the regeneration and the eCAT load, the battery's state of charge may be maintained or decreased/depleted, as shown in graph 306. As the battery's state of charge reaches its upper limit or is determined to be within a predetermined upper range comprising its upper limit, or a period before, the eCAT may be activated and supplied with electrical energy. Depending on the requirements of the hybrid system, the system may maintain the battery at a constant state of charge or decrease/deplete the battery such that the state of charge is reduced to a lower range or a lower level. In this way, the state of charge of the battery can be manipulated to maintain a constant deceleration rate for the vehicle.

Graph 308 depicts the change in the hybrid vehicle's speed over time. In contrast to the conventional method, as depicted in graph 208 above, the rate of deceleration remains constant, and the vehicle occupants will not notice a degradation in drivability. Therefore, the present invention is advantageous, as the eCAT can be utilised as a source of energy consumption to manage a constant deceleration rate of the vehicle and increase or maintain drivability during regeneration events.

Vehicles with high inertia, especially vehicles for heavy-duty application such as a fully laden van, have the potential to capture greater quantities of energy during regeneration events. As a result, hybrid batteries used in such vehicles can reach their maximum energy storage more rapidly than in passenger vehicles. This requires regeneration to be ramped out sooner than it would be desired. One example use case in which this may occur is when such a vehicle drives along a long descent downhill.

Additionally, heavy-duty HEVs such as a mild hybrid are rated to have better deceleration behavior or feel based on objective measuring techniques compared to lighter applications during regeneration events. By implementing examples described herein, as well as preventing the change in drivability and deceleration feel across all vehicle applications, advantages specific to heavy application vehicles can be maintained.

Additionally, during vehicle operation, if consumption of DCDC or auxiliary energy, e.g., by converting high-voltage DC power from the battery to lower-voltage DC power required to run vehicle accessories, is low, more energy than required to maintain emissions alone may be consumed by the eCAT, e.g., by depleting a portion of the battery's state of charge by consumption by the eCAT. This would ensure the state of charge is reduced to a level in which a subsequent regeneration event does not need to be clipped or decreased, mitigating drivability concerns. In such use cases, the eCAT can be used to support emissions in addition to maintaining the vehicle's deceleration performance.

Typically, hybrid vehicles save emissions by switching between the combustion engine and electric power as often as possible, which results in less operation of the combustion engine during which the emissions are reduced by the hybrid vehicle. Conveniently, in some use cases, the need to satisfy emissions and maintain drivability with regeneration are complementary, and eCAT deployment is often likely to be required to maintain emissions in use cases such as during an extended coast down or deceleration/braking event.

If gas flow through the aftertreatment is reduced or limited, it is likely the catalyst temperature will reduce below an acceptable temperature limit to maintain emissions. In the same example, energy would typically be stored through regeneration during a regeneration event, and the battery could potentially be at or close to an upper state of charge threshold. Therefore, in some examples, the eCAT may be activated to consume energy from the hybrid battery or directly from the electric machine based on aftertreatment temperature, e.g., a minimum threshold temperature, and the state of charge of the battery.

In such cases, it would be beneficial to ensure the hybrid battery has sufficient capacity to store more electrical energy than would typically be required to maintain the deceleration feel, either during an ongoing or a future regeneration event, and to effectively maintain a safety margin for regenerative braking. In some examples, the eCAT may be activated to consume energy from the hybrid battery or directly from the electric machine or hybrid system a predetermined period before the aftertreatment temperature reduces to its minimum temperature threshold.

The present invention is advantageous, as energy consumption may not only be utilized to manage the deceleration rate of the vehicle but also to satisfy emissions through eCAT deployment during regeneration events.

FIG. 4 illustrates a schematic flowchart of an example use case of the present invention for use during regeneration events.

At step 402, the system starts an example process according to some examples of the present disclosure. At step 404, it is determined whether positive torque is demanded by the driver, e.g., whether a driver demands torque via a throttle.

At step 406, upon determining that positive torque is not requested by the driver, the current state of charge of the battery is determined. The battery comprises a predetermined upper state of charge limit or threshold, e.g., 70%, and a lower state of charge limit, e.g., 30%, which can be predetermined as being undesirable for the battery, as reaching above and below the upper and lower limits respectively can lead to battery damage.

At step 408, upon determining that the state of charge is within a predetermined range, e.g., 60% to 70%, the PCM may activate the eCAT or determine to increase energy supplied to the eCAT. The energy captured through regeneration is directed to the eCAT such that the battery state of charge remains constant during regeneration. The battery may supplement the energy to the eCAT through discharge or, alternatively, electrical energy may be directly consumed from the hybrid system comprising the electric machine, depending on eCAT demand.

At step 410, upon determining that the state of charge is below the predetermined upper range, e.g., 60% to 70%, the battery is permitted to be charged as normal, i.e., normal hybrid vehicle operation during a regeneration event.

At step 412, the state of charge of the battery can be determined following step 408, eCAT deployment. If the state of charge is determined not to have been decreased to a preferred lower level or a predetermined lower range, e.g., 30% to 40%, steps 404 through to 410 may be repeated as appropriate.

At step 414, upon determining that the battery's state of charge has decreased to the predetermined lower range, e.g., 30% to 40%, the PCM may deactivate the eCAT or determine to decrease the energy supplied to the eCAT. If the regeneration event continues with no torque demand, the electrical energy can be used to charge the hybrid battery as normal.

At step 416, the vehicle returns to its normal hybrid operation, which may include a low level of regeneration (charge) and torque substitution (battery discharge), for example.

The negative torque applied by the electric machine (regeneration) remains constant, and therefore the vehicle's rate of deceleration remains constant also. In effect, this solution overcomes degradation of drivability during regeneration events.

The present invention also provides a method to be used as an alternative to or in combination with torque substitution, which is a method currently deployed on hybrid vehicle applications to reduce the state of charge of a battery. In some examples, methods of alternating the use of torque substitution and the eCAT are provided.

Torque substitution is the application of positive torque from the electric machine, using energy stored at the battery, to the engine. This is to shift the engine's point of operation to a more efficient region and is not an option in the primary use case, as the electric machine is working in the opposite direction, i.e., providing negative torque, for regeneration. Torque substitution is delivered during positive torque operation, e.g., when a driver demands torque via a throttle.

It will be appreciated that torque substitution is intended to optimize CO2/fuel economy by shifting the engine's operation point and not intended to add to the torque output of the engine. Additionally, in cases where the engine of a hybrid vehicle is already operating efficiently, it may be undesirable to implement torque substitution.

During a use case of the present invention during positive torque operation, when the driver demands torque and the battery has a high state of charge, e.g., over a predetermined threshold or within a predetermined upper range, the battery's energy can be used to support the eCAT or, alternatively, torque substitution. The process of supplying or discharging energy to the eCAT or for torque substitution may be determined based on the operational efficiency of the vehicle, e.g., based on aftertreatment temperature conditions.

By implementing torque substitution, the load on the combustion engine is reduced by burning energy stored at the battery, which reduces the temperature of the aftertreatment. Therefore, it may be beneficial to provide energy to the eCAT (during maintenance mode) to maintain the engine torque setpoint constant and to maintain the aftertreatment temperature instead of using torque substitution, depending on aftertreatment temperature conditions.

Figure 5:
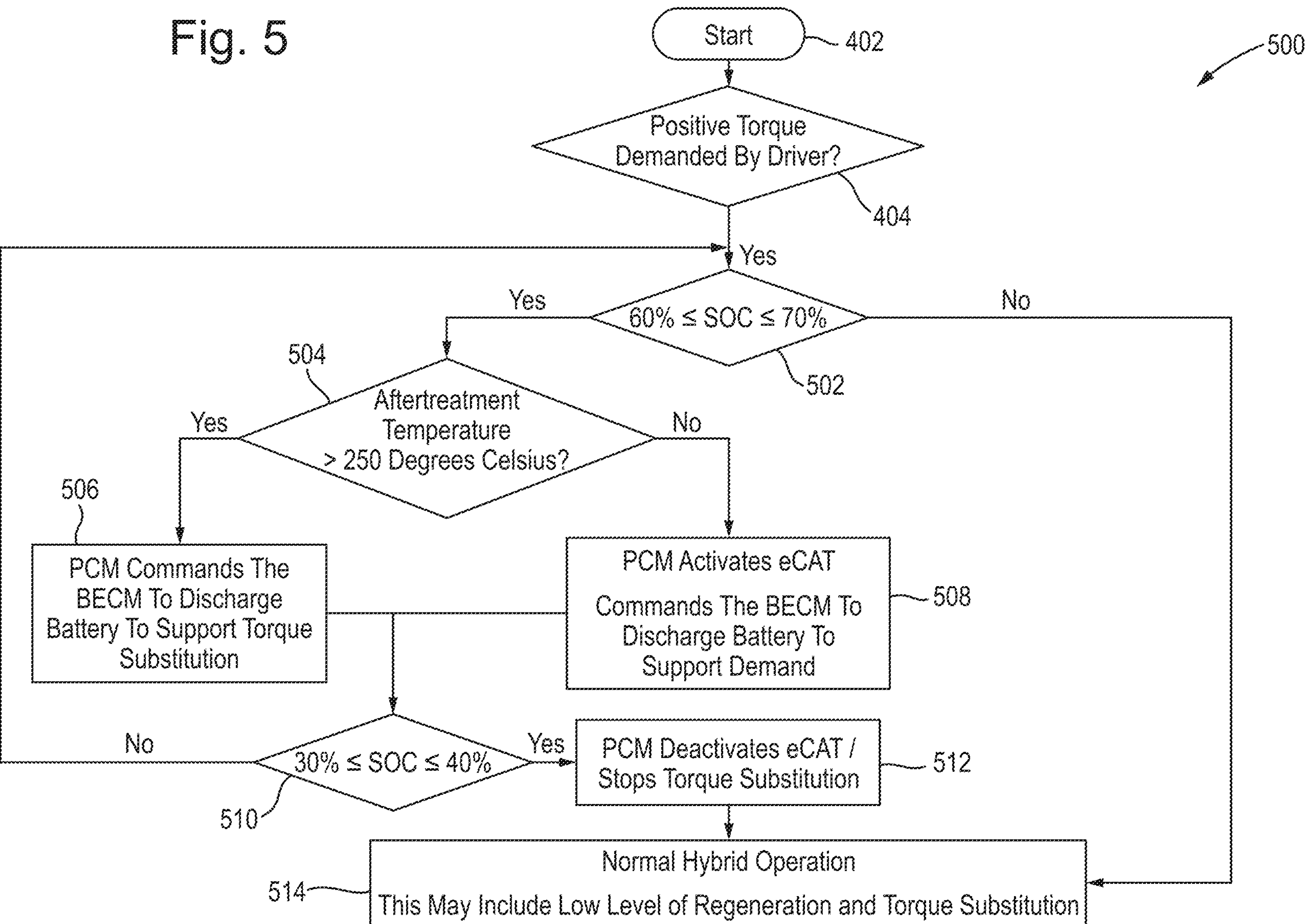
FIG. 5 illustrates a schematic flowchart of an example use case of the present invention, alternating between eCAT deployment and torque substitution, for use during positive torque operations of the hybrid vehicle.

FIG. 5 illustrates a schematic flowchart of an example use case of the present invention, alternating between eCAT deployment and torque substitution, for use during positive torque operations of the hybrid vehicle.

At step 402, the system starts an example process according to some examples of the present disclosure. At step 404, it is determined whether positive torque is demanded by the driver, e.g., when a driver demands torque via a throttle.

At step 502, upon determining that positive torque is requested by the driver, the current state of charge of the battery is determined. The battery has an upper state of charge limit, e.g., 70%, and a lower state of charge limit, e.g., 30%, which are undesirable for the battery and can lead to battery damage.

Upon determining, at step 504, that the state of charge is within a predetermined range, e.g., 60% to 70%, at step 504, it is further determined whether the aftertreatment temperature is above a predetermined threshold or target temperature, e.g., approximately 250 degrees Celsius. By integrating knowledge of the aftertreatment temperature into the process during positive torque operation of the hybrid vehicle, the more efficient process can be determined between eCAT deployment and torque substitution and utilized accordingly.

In order to determine an efficient operating region of the vehicle, the engine's operating point and brake-specific fuel consumption may be taken into account to determine the amount of torque substitution or battery discharge that may be required.

At step 506, upon determining that the aftertreatment temperature is at or above the predetermined threshold or target temperature, the PCM may command the battery energy conversion module (BECM) to discharge the battery to support a high level of torque substitution.

At step 508, upon determining that the aftertreatment temperature is below the threshold or target temperature, the PCM may activate the eCAT module and commands the BECM to discharge the battery to support the required demand.

At step 510, the state of charge of the battery can be determined following step 506, torque substitution, or step 508, eCAT deployment. If the state of charge is determined not to have been decreased to a preferred level, e.g., 30% to 40%, the above steps may be repeated as appropriate.

At step 512, if the state of charge is determined to have decreased to the preferred level, e.g., between 30% and 40%, the PCM may deactivate eCAT usage or torque substitution At step 514, the vehicle returns to its normal hybrid operation, which may include a low level of regeneration (charge) and torque substitution (battery discharge)

The solution described herein enables a calibration between the use of torque substitution and eCAT as alternatives to maintain drivability, depending on the most efficient action to take at that point of the vehicle's operation cycle while taking drivability into account and potentially satisfying emissions requirements.

Figure 6:
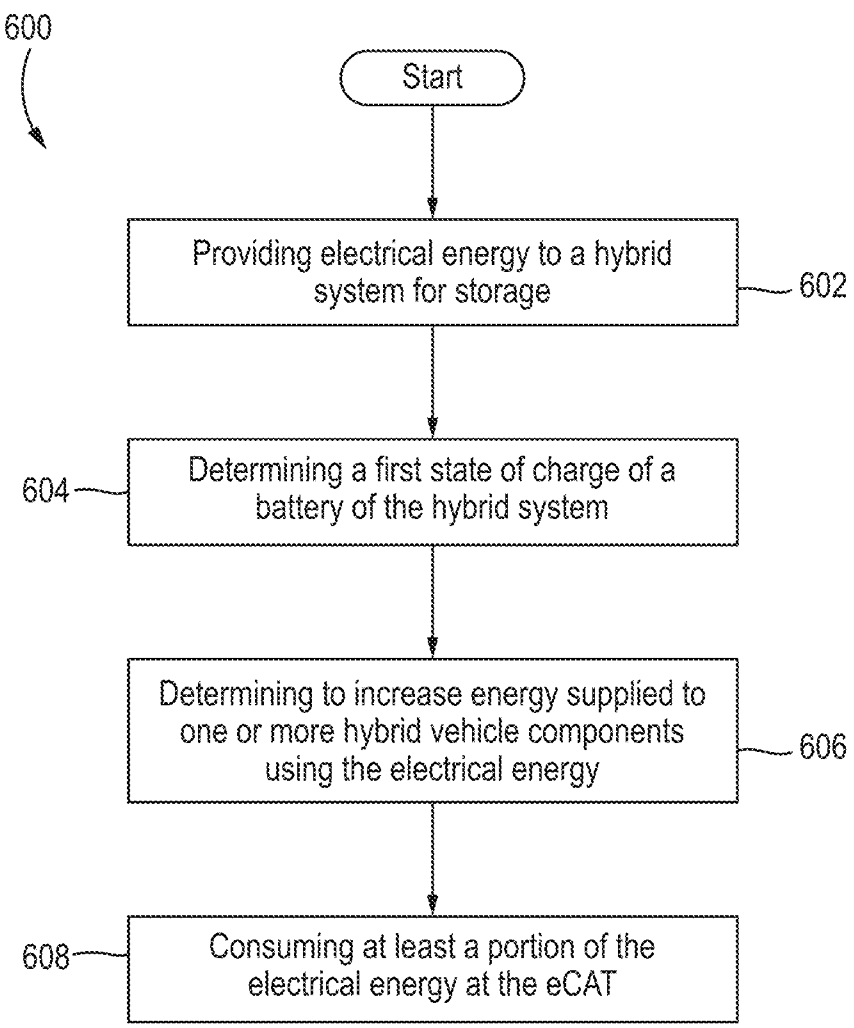
FIG. 6 shows a flowchart of a method of managing a battery's state of charge using an eCAT for a hybrid vehicle.

FIG. 6 shows a flowchart of a method of managing electrical energy provided to a hybrid system using an eCAT for a hybrid vehicle.

At step 602, electrical energy is provided to the hybrid system for storage, e.g., for storage at a hybrid battery. For example, regenerated energy may be stored at the battery during a regeneration event.

At step 604, a first state of charge of a battery comprising the electrical energy is determined. For example, the electrical energy at the battery may be electrical energy stored in a previous regeneration event or a current regeneration event.

At step 606, upon determining that the first state of charge is within a predetermined upper range, or over a predetermined threshold, it is determined to supply the electrical energy to one or more hybrid vehicle components, e.g., determining to increase energy supplied to the eCAT.

At step 608, at least a portion of the electrical energy is consumed at the eCAT, e.g., to decrease or maintain the first state of charge of the battery.

In some examples, at least a portion of the regenerated energy is consumed by the eCAT by consuming regenerated energy from the battery, e.g., by transferring the regenerated energy provided to the battery to the eCAT. In some examples, at least a portion of the regenerated energy is consumed by the eCAT by consuming regenerated energy directly from the hybrid system, e.g., by redirecting the electrical energy provided to the hybrid system from the generator to the eCAT. In some examples, at least a portion of the regenerated energy is consumed at the eCAT by consuming regenerated energy from the battery and directly from the hybrid system.

FIG. 7 shows a flowchart of a method of managing electrical energy provided to a hybrid system during a regeneration event, e.g., a battery's state of charge, using an eCAT, in accordance with some examples of the present disclosure.

As shown at step 702, electrical energy is generated at a generator, e.g., an electric machine such as a BISG, during a regeneration event.

As shown at step 704, the regenerated electrical energy is provided to a hybrid system for storage and/or consumption, as it will be described further below in relation to steps 710 to 718.

As shown at step 706, a first state of charge of a hybrid battery of the hybrid system is determined.

As shown at step 708, the method may further comprise a step of determining a deceleration rate of the hybrid vehicle, e.g., based on the negative torque applied by the generator/electric machine.

As shown at step 710, the method may further comprise a step of determining the electrical energy provided to the hybrid system to be stored and/or consumed at one or more of the hybrid system components.

As shown at step 712, in some examples, the regenerated electrical energy may be stored at the hybrid battery of the hybrid system. The regenerated electrical energy, however, is not required to be stored at the hybrid battery before consumption by other components of the hybrid vehicle, including components or devices connected to the hybrid system using electronic means. Instead, the such components of the hybrid system may consume the regenerated energy directly from the hybrid system.

As shown at step 714, in some examples, a portion of the regenerated electrical energy may be stored at the hybrid battery and a remaining portion the regenerated electrical energy may be consumed by one or more other components of the hybrid system. The components of the hybrid vehicle, as described herein, may be defined to comprise components typically integrated into a hybrid system, e.g., a water pump and a DCDC converter, and also components or devices electrically connected to the hybrid system, such as an eCAT.

As shown at step 716, in some examples, the regenerated electrical energy available at the hybrid system may be consumed by one or more components of the hybrid system, excluding the hybrid battery. For example, the eCAT may consume a portion of the regenerated energy to maintain the rate of regeneration by the generator to the hybrid system even in cases when the hybrid battery nears its predetermined upper state of charge threshold and in incapable of storing additional energy.

As shown at step 718, in some examples, energy discharged from the battery and the regenerated electrical energy available at the hybrid system may be consumed by one or more hybrid vehicle components, excluding the hybrid battery.

Figure 8:
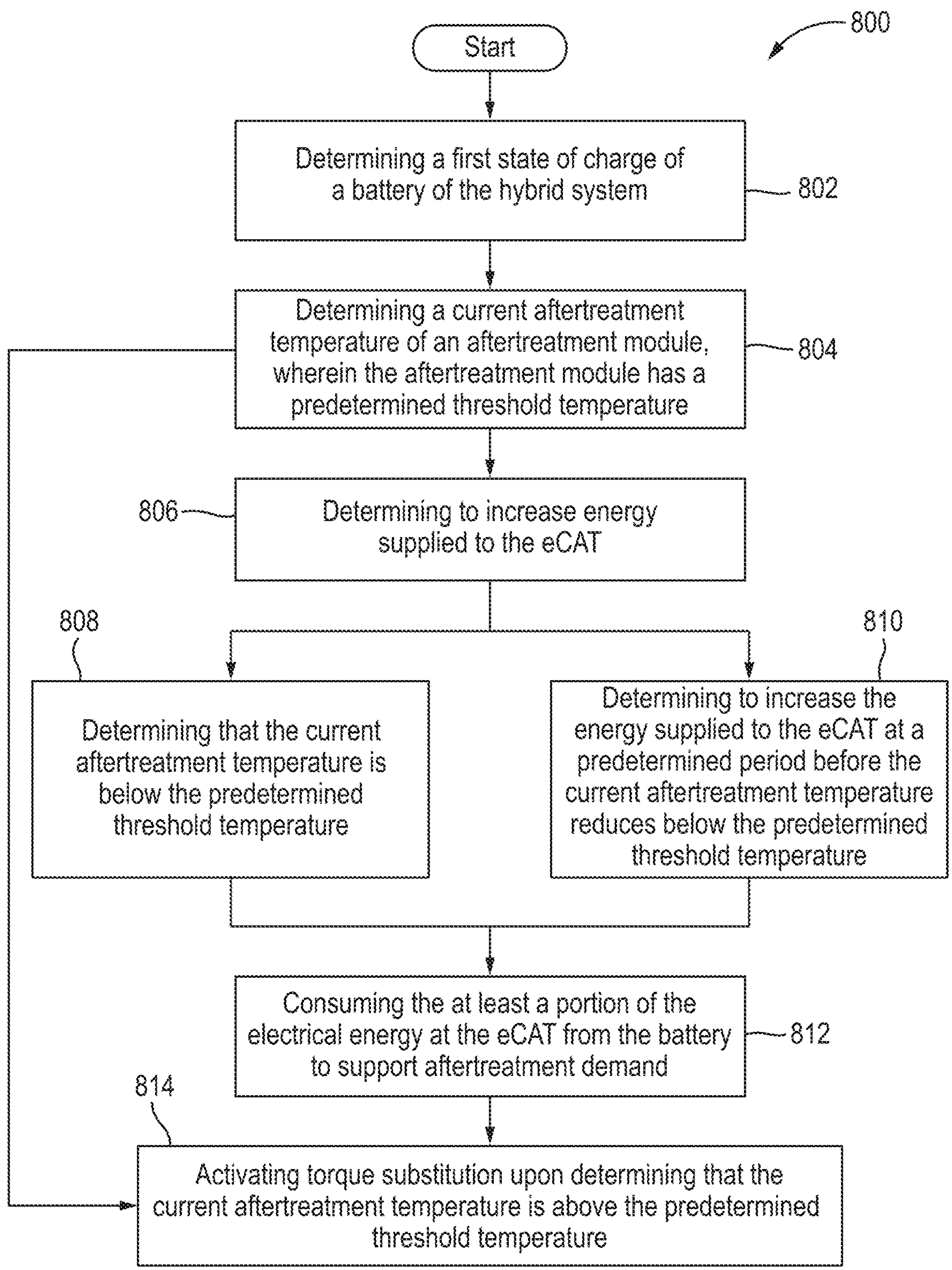
FIG. 8 shows a flowchart of a method of managing a battery's state of charge using an eCAT for a hybrid vehicle during positive torque operations.

FIG. 8 shows a flowchart of a method of managing a battery's state of charge using an eCAT for a hybrid vehicle during positive torque operations, in accordance with some examples of the present disclosure.

As shown at step 802, a first state of charge of a hybrid battery of the hybrid system is determined.

As shown at step 804, the method may further comprise a step of determining a current aftertreatment temperature of an aftertreatment module, wherein the aftertreatment module has a predetermined threshold temperature, e.g., 250 degrees Celsius.

As shown at step 806, it is determined to increase energy supplied to the eCAT. As shown at step 808, the step of determining to increase energy supplied to the eCAT may be further based upon determining that the current aftertreatment temperature is below the predetermined threshold temperature. Alternatively, as shown at step 810, the step of determining to increase energy supplied to the eCAT may further comprise determining to increase the energy supplied to the eCAT at a predetermined period before the current aftertreatment temperature reduces to below the predetermined threshold temperature.

As shown at step 812, the method may further comprise a step of consuming the at least a portion of the electrical energy at the eCAT from the battery to support aftertreatment demand.

As shown at step 814, the method may further comprise a step of activating torque substitution, e.g., to reduce the state of charge of the battery to prevent the battery from exceeding the predetermined upper state of charge threshold, upon determining that the current aftertreatment temperature is above the predetermined threshold temperature. As shown in FIG. 8, torque substitution may be activated as an alternative to activating the eCAT. In some examples, torque substitution may be activated upon determining that the aftertreatment temperature is above the predetermined temperature following eCAT deployment.

In some examples, in addition to the steps described with respect to FIG. 6, 7 or 8, the method may further comprise a step of determining a second state of charge of the battery, determining to decrease the energy supplied to the eCAT upon determining that the second state of charge is within a predetermined lower range, e.g., 30% to 40% state of charge, and terminating consumption of the at least a portion of the regenerated energy at the eCAT, e.g., by deactivating the eCAT. Alternatively, if torque substitution is used to reduce the state of charge of the battery, torque substitution may be terminated upon determining that the second state of charge is within the predetermined lower range.

Examples described herein can be implemented for all hybrid applications with eCAT and are not limited to vehicle type.

Figure 9:
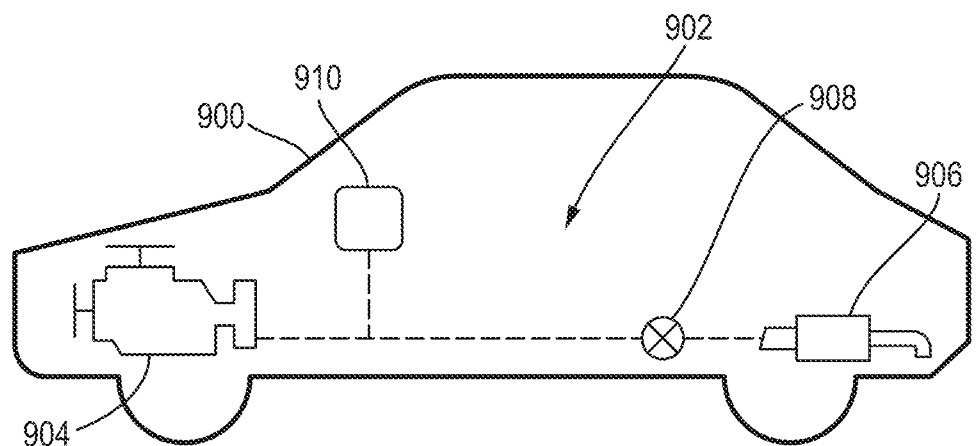
FIG. 9 is a schematic showing a hybrid vehicle comprising an exemplary system of the present invention, in accordance with some examples of the disclosure.

FIG. 9 shows a vehicle 900 comprising a powertrain control module (PCM) 902, in accordance with some examples of the disclosure. In the example shown in FIG. 9, the vehicle 900 comprises an engine 904, a hybrid system 906 and an eCAT 908 configured to manage the state of charge of a battery in the hybrid system 906. Control unit 910 is in operable communication with engine 904, hybrid system 906 and eCAT 908, e.g., using the PCM 902. Control unit 910 is configured to carry out one or more of the above disclosed methods to operate the hybrid system 906, as described above.

Figure 10:
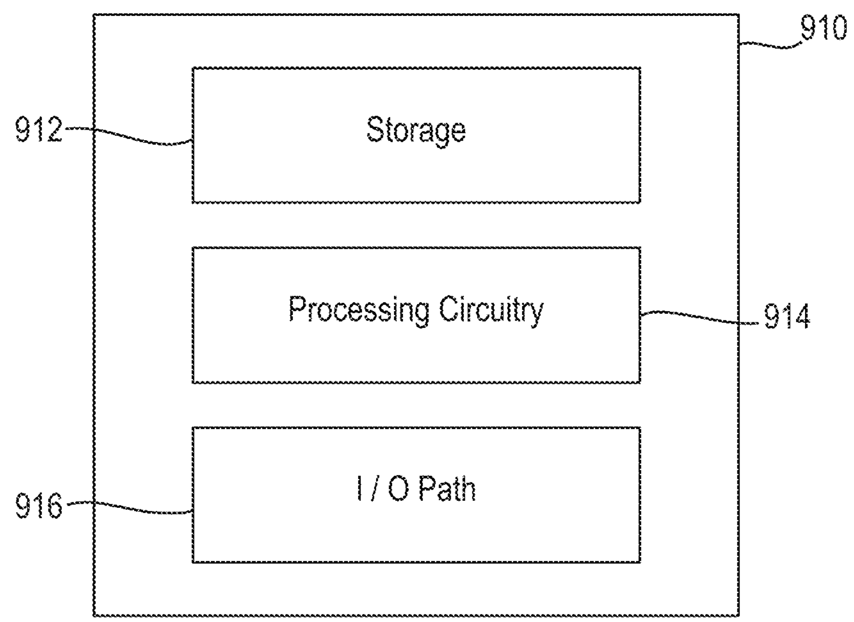
FIG. 10 is a block diagram showing exemplary control circuitry, in accordance with some examples of the disclosure.

FIG. 10 shows an exemplary block diagram of control unit 910. Control unit 910 includes storage 912, processing circuitry 914 and I/O path 916. Control unit 910 may be based on any suitable processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Storage 912, and/or storages of other components of the PCM 902 may be an electronic storage device. As referred to herein, the phrase "electronic storage device" or "storage device" should be understood to mean any device for storing electronic data, computer software, or firmware, such as random-access memory, read-only memory, hard drives, and the like, and/or any combination of the same. In some examples, control unit 910 executes instructions for an application stored in memory, e.g., storage 912. Specifically, control unit 910 may be instructed by an application to perform the methods/functions discussed herein.

The control unit 910 may be configured to transmit and/or receive data via I/O path 916. For instance, I/O path 916 may include a communication port(s) configured to transmit and/or receive data from at least one of an engine control module, an actuator control module and a vehicular system control module, such as an exhaust system control module.

This disclosure is made for the purpose of illustrating the general principles of the systems and processes discussed above and are intended to be illustrative rather than limiting. More generally, the above description is meant to be exemplary and not limiting and the scope of the disclosure is best determined by reference to the appended claims. In other words, only the claims that follow are meant to set bounds as to what the present disclosure includes.

While the present disclosure is described with reference to particular example applications, shall be appreciated that the disclosure is not limited hereto. It will be apparent to those skilled in the art that various modifications and improvements may be made without departing from the scope and spirit of the present disclosure. Those skilled in the art would appreciate that the actions of the processes discussed herein may be omitted, modified, combined, and/or rearranged, and any additional actions may be performed without departing from the scope of the disclosure.

Any system features as described herein may also be provided as a method feature and vice versa. As used herein, means plus function features may be expressed alternatively in terms of their corresponding structure. It shall be further appreciated that the systems and/or methods described above may be applied to, or used in accordance with, other systems and/or methods.

Any feature in one aspect may be applied to other aspects, in any appropriate combination. In particular, method aspects may be applied to system aspects, and vice versa. Furthermore, any, some and/or all features in one aspect can be applied to any, some and/or all features in any other aspect, in any appropriate combination.

It should also be appreciated that particular combinations of the various features described and defined in any aspects can be implemented and/or supplied and/or used independently.

What is claimed is:

1. A method for managing a state of charge (SoC) of a hybrid vehicle battery, the method comprising:

providing electrical energy to a hybrid vehicle system during an energy regeneration event;

determining a first SoC of the battery;

upon determining when the first SoC is within a predetermined upper range, increasing energy supplied to one or more hybrid vehicle components, the one or more hybrid vehicle components comprising at least an electrically heated catalyst (eCAT);

activating the eCAT to consume at least a portion of the electrical energy to maintain or decrease the SoC of the battery;

determining an amount of electrical energy transmitted to the battery during the energy regeneration event; and increasing the portion of the electrical energy consumed by the eCAT to maintain the SoC of the battery.

2. The method of claim 1, further comprising:

monitoring a level of DCDC or auxiliary energy consumption during vehicle operation;

determining an amount of electrical energy transmitted to the battery during a regeneration event;

comparing the level of DCDC or auxiliary energy consumption with the amount of electrical energy transmitted to the battery; and upon determining that the level of DCDC or auxiliary energy consumption is lower than the amount of electrical energy transmitted to the battery, increasing the portion of the electrical energy consumed by the eCAT thereby reducing the SoC of the battery.

3. The method of claim 1, further comprising:

determining a second SoC of the battery;

upon determining that the second SoC is within a predetermined lower range, determining to decrease a portion of the electrical energy supplied to the one or more hybrid vehicle components; and terminating the step of consuming at least a portion of the electrical energy at the eCAT.

4. A method for managing a state of charge (SoC) of a hybrid vehicle battery, the method comprising:

providing electrical energy to a hybrid vehicle system during an energy regeneration event;

determining a first SoC of the battery;

upon determining when the first SoC is within a predetermined upper range, increasing energy supplied to one or more hybrid vehicle components, the one or more hybrid vehicle components comprising at least an electrically heated catalyst (eCAT);

activating the eCAT to consume at least a portion of the electrical energy to maintain or decrease the SoC of the battery;

determining a current aftertreatment temperature of an aftertreatment module, wherein the aftertreatment module has a predetermined threshold temperature; and activating torque substitution upon determining that the current aftertreatment temperature is above the predetermined threshold temperature.

5. The method of claim 4 further comprising:

monitoring the current aftertreatment temperature;

in response to determining that the current aftertreatment temperature is below the predetermined threshold temperature, activating the eCAT to consume at least a portion of the electrical energy to support aftertreatment demand; and maintaining the activation of the eCAT to consume at least a portion of the electrical energy as long as the current aftertreatment temperature remains below the predetermined threshold temperature.

6. The method of claim 4 further comprising:

monitoring the SoC of the battery;

determining a period before the SoC of the battery reaches a predetermined upper limit; and activating the eCAT to consume at least a portion of the electrical energy during the determined period to prevent the SoC from reaching the predetermined upper limit.

7. A system for managing a state of charge (SoC) of a hybrid vehicle battery, the system comprising control circuitry configured to carry out the method of claim 1.

8. The system of claim 7, wherein the control circuitry is further configured to:

determine an amount of electrical energy transmitted to the battery during the energy regeneration event; and increase the portion of the electrical energy consumed by the eCAT to maintain the SoC of the battery.

9. The system of claim 7, wherein the control circuitry is further configured to:

monitor a level of DCDC or auxiliary energy consumption during vehicle operation;

determine an amount of electrical energy transmitted to the battery during a regeneration event;

compare the level of DCDC or auxiliary energy consumption with the amount of electrical energy transmitted to the battery; and increase the portion of the electrical energy consumed by the eCAT upon determining that the level of DCDC or auxiliary energy consumption is lower than the amount of electrical energy transmitted to the battery, thereby reducing the SoC of the battery.

10. The system of claim 7, wherein the control circuitry is further configured to:

determine a deceleration rate of the hybrid vehicle; and consume at least a portion of the electrical energy at the eCAT to maintain the deceleration rate.

11. The system of claim 7, wherein the control circuitry is further configured to:

determine a current aftertreatment temperature of an aftertreatment module, wherein the aftertreatment module has a predetermined threshold temperature.

12. The system of claim 11, wherein the control circuitry is further configured to:

activate torque substitution upon determining that the current aftertreatment temperature is above the predetermined threshold temperature.

13. The system of claim 11, wherein the control circuitry is further configured to:

monitor the current aftertreatment temperature;

activate the eCAT to consume at least a portion of the electrical energy to support aftertreatment demand in response to determining that the current aftertreatment temperature is below the predetermined threshold temperature; and maintain the activation of the eCAT to consume at least a portion of the electrical energy as long as the current aftertreatment temperature remains below the predetermined threshold temperature.

14. The system of claim 11, wherein the control circuitry is further configured to:

monitor the SoC of the battery;

determine a period before the SoC of the battery reaches a predetermined upper limit; and activate the eCAT to consume at least a portion of the electrical energy during the determined period to prevent the SoC from reaching the predetermined upper limit.

15. The system of claim 7, wherein the control circuitry is further configured to:

determine a second SoC of the battery;

decrease a portion of the electrical energy supplied to the one or more hybrid vehicle components upon determining that the second SoC is within a predetermined lower range; and terminate the consumption of at least a portion of the electrical energy at the eCAT.

16. A method for managing a state of charge (SoC) of a hybrid vehicle battery, the method comprising:

providing electrical energy to a hybrid vehicle system during an energy regeneration event;

determining a first SoC of the battery;

upon determining when the first SoC is within a predetermined upper range, increasing energy supplied to one or more hybrid vehicle components, the one or more hybrid vehicle components comprising at least an electrically heated catalyst (eCAT);

activating the eCAT to consume at least a portion of the electrical energy to maintain or decrease the SoC of the battery;

determining a deceleration rate of the hybrid vehicle; and consuming at least a portion of the electrical energy at the eCAT to maintain the deceleration rate.

* * * * *